United States Patent

[11] 3,536,136

| | | |
|---|---|---|
| [72] | Inventor | Stanley C. Jones<br>Littleton, Colorado |
| [21] | Appl. No. | 861,157 |
| [22] | Filed | Sept. 25, 1969<br>Continuation-in-part of Ser. No. 746,258, July 22, 1968, now Patent No. 3,493,048 |
| [45] | Patented | Oct. 27, 1970 |
| [73] | Assignee | Marathan Oil Company<br>Findlay, Ohio<br>a corporation of Ohio |

[54] OIL RECOVERY PROCESS WITH COSURFACTANT INFLUENCING THE THERMOSTABILITY OF MICELLAR DISPERSIONS
26 Claims, No Drawings

[52] U.S. Cl. ............................................ 166/252, 166/275, 252/8.55, 252/312
[51] Int. Cl. ........................................ E21b 43/22, B01j 13/00
[50] Field of Search ........................................ 166/252, 250, 268, 274, 275, 273, 304, 305; 252/8.55, 8.5, 308, 310, 312

[56] References Cited
UNITED STATES PATENTS

| | | | |
|---|---|---|---|
| 2,289,536 | 7/1942 | Bradley ..................... | 252/312X |
| 3,117,929 | 1/1964 | McCoy et al. ............. | 252/312X |
| 3,254,714 | 6/1966 | Gogarty et al. ............ | 166/274 |
| 3,297,084 | 1/1967 | Gogarty et al. ............ | 166/274X |
| 3,330,343 | 7/1967 | Tosch et al. ............... | 166/273 |
| 3,330,344 | 7/1967 | Reisberg .................... | 166/274 |
| 3,346,494 | 10/1967 | Robbins et al. ............ | 252/310X |
| 3,476,184 | 11/1969 | Davis .......................... | 166/273 |
| 3,477,511 | 11/1969 | Jones et al. ................ | 166/273 |

*Primary Examiner*—Stephen J. Novosad
*Attorneys*—Joseph C. Herring, Richard C. Willson, Jr. and Jack L. Hummel

ABSTRACT: Thermostability range of a micellar dispersion containing hydrocarbon, aqueous medium, surfactant and cosurfactant is shifted to higher temperature ranges by increasing the molecular weight of cosurfactant within the micellar dispersion. The micellar dispersion can optionally contain electrolyte. Such micellar dispersions are useful in recovering crude oil in a secondary or tertiary oil recovery process, especially where the temperature is in excess of ambient temperature (*i.e.* about 72°F.)

OIL RECOVERY PROCESS WITH COSURFACTANT INFLUENCING THE THERMOSTABILITY OF MICELLAR DISPERSIONS

CROSS REFERENCE TO RELATED APPLICATIONS

This is a continuation-in-part of copending application Ser. No. 746,258, filed July 22, 1968 now U.S. Pat. No. 3,493,048.

BACKGROUND OF THE INVENTION

Micellar dispersions are useful to recover crude oil from subterranean formations. Examples of processes using micellar dispersions are taught in U.S. Pat. Nos. 3,254,714; 3,275,075; and 3,297,084 to Gogarty et al.

The method of recovery is accomplished by injecting the micellar dispersion into an injection well in fluid communication via an oil-bearing subterranean formation with a producing well and displacing the micellar dispersion through the formation; crude oil is recovered through the producing well. Due to the depth and conditions of the reservoir, the reservoir temperature can vary over a wide range of temperatures, e.g. from below about ambient temperature to about 250°F. or more. It is generally accepted that the normal temperature gradient of the subsurface is about 1°F. per 60 feet.

Applicant has discovered that by increasing the molecular weight of cosurfactant in the micellar dispersion the thermostability of the dispersion can be shifted to higher temperature ranges. This is accomplished by adding a high molecular weight cosurfactant to a micellar dispersion containing a lower molecular weight cosurfactant or by choosing a high molecular weight cosurfactant to impart thermostability at the higher temperature However, the micellar dispersion may be unstable at a lower temperature range with the high molecular weight cosurfactant The term "thermostability" as used herein means thermodynamically stable, i.e. a system below or above the thermostability temperature range will exhibit two or more distinct layers or phases, indicating an unstable system or an emulsion.

DESCRIPTION OF THE INVENTION

The term "micellar dispersion" as used herein is meant to include micellar solutions, "micro-emulsions" "transparent" emulsions (Blair, Jr. et al. U.S. Pat. No. 2,356,205) and micellar dispersion technology taught by C. G. Sumner, Clayton's, The Theory of Emulsions and Their Technical Treatment, 5th Edition, pp. 315—320 (1954). Micellar dispersions differ from emulsions in many ways, the strongest differentiation being that the former are thermodynamically stable and generally transparent whereas the latter are not.

The micellar dispersion is composed of hydrocarbon, aqueous medium, surfactant, and cosurfactant. Optionally, electrolyte can be incorporated into the dispersion. Examples of volume amounts include from about 4 percent to about 70 percent or more of hydrocarbon, from about 10 percent to about 90 percent aqueous medium, at least about 4 percent surfactant, from about 0.01 to about 20 percent of cosurfactant (also identified as semipolar organic compound and cosolubilizer) and from about 0.001 up to about 5 percent or more by weight (based on the aqueous medium) of electrolyte. In addition, the dispersion can contain other additives such as corrosion and scale inhibitors, bactericides, etc.

The micellar dispersion can be oil-external or water-external.

Examples of hydrocarbon include crude oil (both sweet and sour) and partially refined fractions thereof, e.g. side cuts from crude columns, crude column overheads, gas oils, kerosene, heavy naphthas naphthas, straight-run gasoline, liquefied petroleum gases, etc. Other hydrocarbons useful include paraffin compounds including propane, pentane, heptane, decane, dodecane, etc.; cycloparaffin compounds including cyclohexane, etc.; aryl compounds including monocyclic as well as polycyclic and substituted products thereof including toluene, alkyl phenols, etc. Based on economics, the preferred hydrocarbon is one locally available. The hydrocarbon can also be the unsulfonated hydrocarbon (e.g. unsulfonated gas oils) in petroleum sulfonates.

The aqueous medium can be soft, brackish, or a brine. Preferably, the water is soft, but it can contain small amounts of salts which are compatible with the ions in the subterranean formation being flooded.

Surfactants useful with the dispersions include nonionic, cationic, and anionic surfactants. Examples of such surfactants include those found in U.S. Pat. No. 3,254,714 to Gogarty et al. Other useful surfactants include Duponol WAQE (a 30 percent active sodium lauryl sulfate marketed by DuPont Chemical Corporation, Wilmington, Delaware), Energetic W-100 (a polyoxyethylene alkyl phenol marketed by Armour Chemical Company, Chicago, Illinois), Triton X-100 (an alkylphenoxy polyethoxy ethanol marketed by Rohm & Haas, Philadelphia, Pennsylvania) and Arquad 12-50 (a 50 percent active dodecyl trimethyl ammonium chloride marketed by Armour Chemical Company, Chicago, Illinois), and like materials.

An especially useful surfactant is petroleum sulfonate, also known as alkyl aryl naphthenic sulfonate. Such can be obtained by sulfonating at least a portion of a sulfonatable hydrocarbon (e.g. gas oils) and then neutralizing hydrocarbon the mixture, e.g. with $NH_4OH$, $NaOH$, $NH_3$, etc. The sulfonate can contain from about 50 percent to about 100 percent active sulfonate. Examples of preferred surfactants are the sodium and ammonium petroleum sulfonates having an average equivalent weight of from about 350 to about 520, and more preferably from about 400 to about 470. The sulfonate can be a mixture of low and high average equivalent weight sulfonates. Mixtures of different surfactants as well as surfactants of like character are also useful.

The cosurfactant useful with the invention should have limited water solubility, e.g. from about .001 percent to about 20 percent at ambient temperature. Examples of cosurfactants include alcohols, amino compounds, esters, aldehydes and ketones containing from 3 to about 20 or more carbon atoms and more preferably from about 5 to about 16 carbon atoms. The cosurfactant is preferably an alcohol, and more preferably is a primary, secondary or tertiary mono hydroxy alcohol. Examples of alcohols include n- and isobutanol, the anyl alcohols such as n-amyl alcohol, 1- and 2- hexanol, 1- and 2- octanol, decyl alcohols, alkaryl alcohols such as p-nonyl phenol and alcoholic liquors such as fusel oil. Concentrations of from about 0.01 percent to more than about 20 volume percent are useful in the micellar dispersion and more preferably from about 0.01 to about 5 percent. Mixtures of two or more cosurfactants are useful in the micellar dispersions.

Electrolytes useful in the dispersion include inorganic bases, inorganic acids, inorganic salts, organic bases, organic acids, and organic salts. Examples of useful electrolytes are found in U.S. Pat. Nos. 3,297,084 and 3,330,343. Preferably, the electrolytes are inorganic acids, inorganic bases, and inorganic salts. Examples of preferable electrolytes include sodium sulfate, sodium chloride, sodium hydroxide, hydrochloric acid, sulfuric acid, and sodium nitrate.

As mentioned previously, the thermostability of the micellar dispersion is shifted to higher temperatures by increasing the molecular weight of cosurfactant(s) in the dispersion or by choosing a high molecular weight cosurfactant to obtain stability at the higher temperatures. Reservoir temperatures exceeding ambient temperature, e.g. 100, 150, 200, or 250° F. will not adversely influence an oil recovery process wherein the micellar dispersions are obtained by this invention. That is, the micellar dispersion can be designed to have thermostability within the temperature range of the reservoir rock.

The lowest thermostability range of a particular micellar dispersion of this invention would be one containing a low molecular weight cosurfactant, e.g. propanol. The highest thermostability range of the particular micellar dispersion would be one containing a high molecular weight cosurfactant, e.g. an alcohol containing 20 carbon atoms. The amount and kind of surfactant, electrolyte, water, and hydrocarbon will influence the particular cosurfactant to obtain a micellar dispersion having desired characteristics. These characteristics include mobility, oil and water miscibility as well as thermostability. For example, higher molecular weight alcohols are preferably used with low equivalent weight surfactants. Also, for a given molecular weight alcohol, a secondary alcohol imparts a lower thermostability range than a primary alcohol and a tertiary imparts a lower thermostability range than a primary alcohol and a tertiary imparts a lower temperature range than a secondary alcohol.

Preferably, the micellar dispersion has a mobility less than the mobility of the formation fluids (e.g. crude oil plus interstitial water) within the reservoir formation. That is, the mobility of the micellar dispersion is preferably about equal to or less than that of the combined mobility of the crude oil and interstitial water within the reservoir.

The following example is submitted to illustrate working embodiments of the invention. The invention is not to be restricted or limited by this example. Rather, equivalents or obvious extensions known in the art are intended to be included within the scope of the invention as taught within the specification and appended claims.

EXAMPLE 1

Two micellar dispersions having compositions as indicated in table I are tested for their thermostability range by subjecting them to a broad temperature range. the thermostability ranges are indicated in table I. Temperatures below the "Lower Temperature Limit" and temperatures above the "Upper Temperature Limit" give two or more distinct layers or phases. Temperatures between these limits give a thermodynamically stable micellar dispersion. Unless otherwise specified, percents are based on volume. Data are found in table I:

5. The process of claim 1 wherein the formation temperature is in excess of about 200°F.

6. The process of claim 1 wherein the surfactant is petroleum sulfonate.

7. The process of claim 1 wherein the cosurfactant is selected from the group consisting of alcohols, amino compounds, esters, aldehydes, and ketones containing from about 3 to about 20 carbon atoms.

8. The process of claim 1 wherein the cosurfactant is an alcohol having less than about 20 percent water solubility at 72°F.

9. A process of claim recovering crude oil from an oil-bearing subterranean formation having at least one injection means in fluid communication with at least one production means, the process comprising: determining the temperature of the formation to be in excess of about 72°F., injecting into the formation a micellar dispersion comprised of hydrocarbon, petroleum sulfonate, aqueous medium, and cosurfactant having less than about 20 percent water solubility at 72°F., the cosurfactant characterized as having a sufficiently high molecular weight to stabilize the mixture of micellar dispersion components at the formation temperature, displacing the micellar dispersion through the formation and recovering crude oil through the production means.

10. The process of claim 9 wherein the cosurfactant is an alcohol containing up to about 20 carbon atoms.

11. The process of claim 9 wherein the mixture of micellar dispersion components contains electrolyte.

12. A process of stabilizing a mixture of micellar dispersion components comprised of hydrocarbon, surfactant, aqueous medium, and cosurfactant at temperatures of excess of about 72°F., comprising increasing the molecular weight of the cosurfactant introduced into the mixture to stabilize the mixture at the temperature in excess of about 72°F.

13. The process of claim 12 wherein the surfactant is a petroleum sulfonate.

TABLE I

|  | Micellar Dispersion | |
| --- | --- | --- |
|  | Number 1 | Number 2 |
| Component: |  |  |
| (a) Ammonium petroleum sulfonate (percent). | 8.0—Avg. MW=430, 68% active. | 6.9—Avg. MW=420 100% active. |
| (b) Hydrocarbon (percent). | 42.0—No. 2 diesel fuel. | 35.0—crude oil. |
| (c) Water (percent) | 49.85—contains 400 p.p.m. dissolved solids. | 58.1—contains about 2,000 p.p.m. dissolved solids. |
| (d) Cosurfactant (ml./100 gms. of dispersion). | 1.20—p-amyl alchool. | 2.5—n-hexanol. |
| Thermostability range (° F.): |  |  |
| (1) Lower temperature limit. | 65. | 173. |
| (2) Upper temperature limit. | 126. | 208. |

NOTE.—Although the components are not at a common concentration, dispersion number 2 containing n-hexanol indicates a higher thermostability range.

I claim:

1. A process of recovery crude oil from an oil-bearing subterranean formation having at least one injection means in fluid communication with at least one production means, the process comprising: determining the temperatures of the formation, injecting into the formation a stabilizable mixture of micellar dispersion components comprised of hydrocarbon, surfactant, aqueous medium, and cosurfactant wherein the cosurfactant has a sufficiently high molecular weight to stabilize the mixture as a micellar dispersion at the formation temperature, displacing the micellar dispersion through the formation and recovering crude oil through the production means.

2. The process of claim 1 wherein the stabilizable mixture of micellar dispersion components contains electrolyte.

3. The process of claim 1 wherein the formation temperature is in excess of about 72°F.

4. The process of claim 1 wherein the formation temperature is in excess of about 150°F.

14. The process of claim 12 wherein the cosurfactant is an alcohol having less than about 20 percent water solubility at 72°F.

15. The process of claim 12 wherein the temperature is in excess of about 150°F.

16. A process of stabilizing a mixture of micellar dispersion components comprised of hydrocarbon, surfactant, aqueous medium, and cosurfactant at a temperature in excess of about 72°F., comprising incorporating into the mixture a cosurfactant of sufficiently high molecular weight to obtain a stable micellar dispersion at the temperature and mixing the components to obtain the micellar dispersion.

17. The process of claim 16 wherein the cosurfactant is an alcohol containing from about 3 to about 20 carbon atoms.

18. A process of recovering crude oil from an oil-bearing formation having at least one injection means in fluid communication with at least one production means, the process comprising determining the temperature of the formation, injecting into the formation a stabilizable mixture of micellar dispersion components comprised of hydrocarbon, surfactant, aqueous medium, and cosurfactant wherein the cosurfactant has a sufficiently high oleophilicy to stabilize the mixture as a micellar dispersion at the formation temperature, displacing the micellar dispersion through the formation and recovering crude oil through the production means.

19. The process of claim 18 wherein the formation temperature is in excess of about 72°F.

20. The process of claim 18 wherein the formation temperature is in excess of about 150°F.

21. The process of claim 18 wherein the surfactant is a petroleum sulfonate.

22. The process of claim 18 wherein the cosurfactant contains about 3 to about 20 carbon atoms.

23. A process of stabilizing a mixture of micellar dispersion components comprised of hydrocarbon, surfactant, aqueous medium, and cosurfactant(s) at temperatures in excess of about 72°F., comprising increasing the oleophilicy of the cosurfactant introduced into the mixture to stabilize the mixture at the temperature in excess of about 72°F.

24. The process of claim 23 wherein the surfactant is a petroleum sulfonate.

25. The process of claim 23 wherein the cosurfactant contains about 3 to about 20 carbon atoms.

26. The process of claim 23 wherein the temperature is in excess of 150°F.

PO-1050
(5/69)

UNITED STATES PATENT OFFICE
CERTIFICATE OF CORRECTION

Patent No. __3,536,136__   Dated __November 20, 1970__

Inventor(s) __Stanley C. Jones__

It is certified that error appears in the above-identified patent and that said Letters Patent are hereby corrected as shown below:

| | |
|---|---|
| Col. 1, line 44: | After "micro-emulsions" insert --[Schulman and Montagne, *Annals of the New York Academy of Sciences*, 92, pages 366-371 (1961)],-- |
| Col. 1, line 69: | After "heavy naphthas" insert --,--. |
| Col. 2, line 7: | Delete "formation" and insert --formations--. |
| Col. 3, Table I, Number I: | Delete "alchool" and insert --alcohol--. |
| Col. 3, line 59, Claim 1: | Delete "recovery" and insert --recovering--. |
| Col. 3, line 62: | Delete "temperatures" and insert --temperature--. |
| Col. 4, line 12, Claim 9: | Delete "claim" in first sentence of this claim. |
| Col. 4, line 32, Claim 12: | Delete "of excess" and insert --in excess--. |

SIGNED AND
SEALED
JAN 19 1971

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,536,136       Dated October 27, 1970

Inventor(s) Stanley C. Jones

It is certified that error appears in the above-identified patent and that said Letters Patent are hereby corrected as shown below:

Column 3, lines 9 and 10, cancel "thermostability range than a primary alcohol and a tertiary imparts a lower".

Signed and sealed this 11th day of May 1971.

(SEAL)
Attest:

EDWARD M. FLETCHER, JR.
Attesting Officer

WILLIAM E. SCHUYLER, JR.
Commissioner of Patents